Nov. 3, 1931.                E. ROHDE                1,830,133
                     PEELER ATTACHMENT FOR KNIVES
                         Filed Feb. 24, 1930
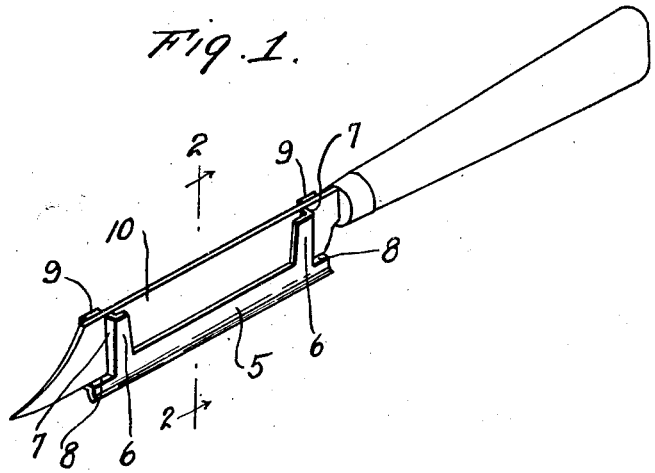
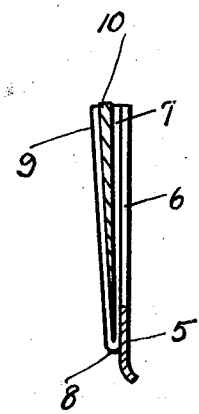
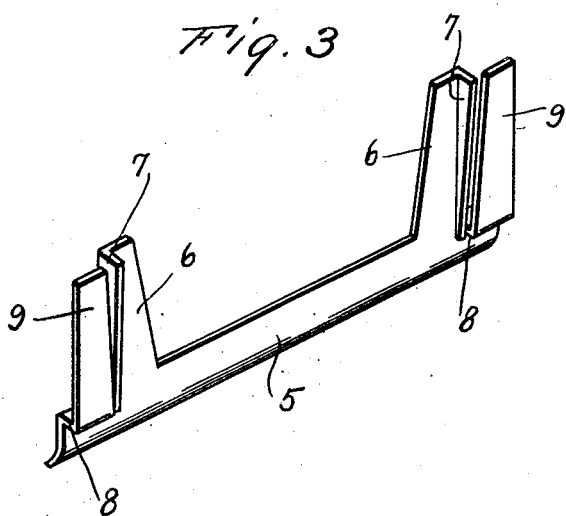
Inventor
Erwin Rohde
By Clarence A. O'Brien
Attorney Patented Nov. 3, 1931

1,830,133

UNITED STATES PATENT OFFICE

ERWIN ROHDE, OF CHICAGO, ILLINOIS

PEELER ATTACHMENT FOR KNIVES

Application filed February 24, 1930. Serial No. 430,974.

The present invention relates to a peeler attachment for a knife and has for its prime object to provide a device which may be easily attached to a knife so as to peel vegetables, fruit and like in an easy and expeditious manner.

Another very important object of the invention resides in the provision of an attachment of this nature which is simple in its construction, inexpensive to manufacture, strong and durable, thoroughly efficient and reliable and otherwise well adapted to the purpose for which it is designed.

With the above and numerous other objects in view as will appear as the description proceeds, the invention resides in certain novel features of construction, and in the combination and arrangement of parts as will be hereinafter fully described and claimed.

In the drawings:

Figure 1 is a perspective view of the attachment showing the same on a knife blade, Figure 2 is a sectional view taken substantially on the line 2—2 of Figure 1, and Figure 3 is a perspective view of the attachment.

Referring to the drawing in detail it will be seen that the attachment is provided with an elongated plate 5 which is transversely bowed. A pair of arms 6 rise from the upper edge of the plate being spaced from each other and slightly spaced from the ends of the plate. These arms are provided at their outer edges with right angularly extending flanges 7 which taper downwardly in width.

Lateral extensions are formed on the upper edges of the plate 5 at the ends thereof and merge into upright spring fingers 9 which are normally sprung past the edges of the flanges 7 so that they must be sprung in the opposite direction to insert the knife blade 10 between the edges of the flanges 7 and the fingers so that portions of the cutting edge of the blade rest on the extensions 8.

The convex side of the plate 5 is adapted to engage the vegetable or fruit being prepared and it will be seen that the peelings will pass out between the blade, the plate 5 and between the arms 6.

This attachment has numerous important advantages some of which will be enumerated in detail. The three sided space between the plate 5 and the arms 6 facilitate the free passage of the peelings. The taper of the two flanges 7 just inside the spring fingers or clips 9 serve to the same purpose. The two spring fingers or clips referred to supply the pressure which holds the article firmly on the blade of the knife.

The bottom edge of the plate 5 may be used for scraping purposes. In actual practice the length of the attachment is such as to allow the freedom of at least three quarters of an inch of the point which may be used for carving the irregular portions of the surface of the subject being pared as illustrated to advantage in Figure 1.

It is thought that the construction, operation, utility and advantages of this invention will become apparent to those skilled in this art without a more detailed description thereof.

It is apparent that changes in the details of construction may be resorted to without departing from the spirit or scope of the invention as hereinafter claimed or sacrificing any of its advantages.

Having thus described my invention, what I claim as new is:

1. An attachment of the class described including an elongated plate transversely curved, a pair of arms rising from the upper edge of the plate in spaced relation to each other and slightly spaced from the ends of the plate and being formed at their outer edges on the same side of the plate with lateral right angularly extending flanges, said plate being formed with laterally extending portions on the end portions of the upper edge thereof beyond the arms which merge into upstanding spring fingers.

2. An attachment of the class described including an elongated plate transversely curved, a pair of arms rising from the upper edge of the plate in spaced relation to each other and slightly spaced from the ends of the plate and being formed at their outer edges on the same side of the plate with lateral right angularly extending flanges, said plate being formed with laterally extending portions on the end portions of the upper edge thereof beyond the arms which merge into upstanding spring fingers, said flanges tapering in width downwardly.

In testimony whereof I affix my signature.

ERWIN ROHDE.